Nov. 2, 1965             E. HURST            3,215,218
TRACTION INCREASING MEANS FOR VEHICLES
Filed Nov. 1, 1960            2 Sheets-Sheet 1
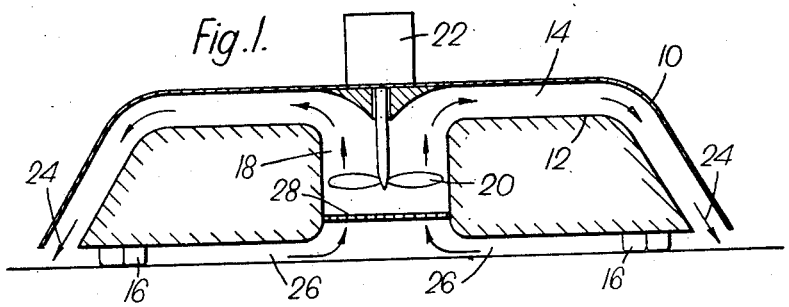
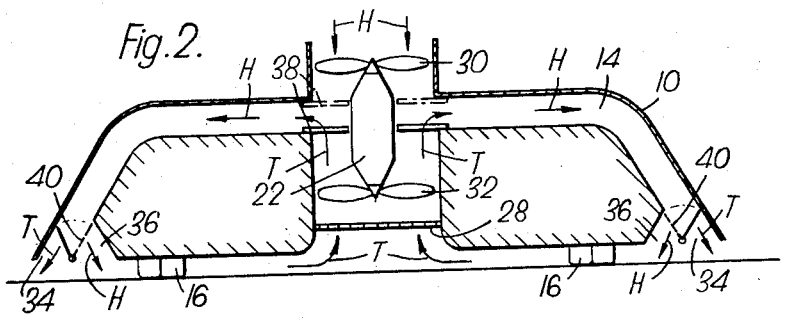
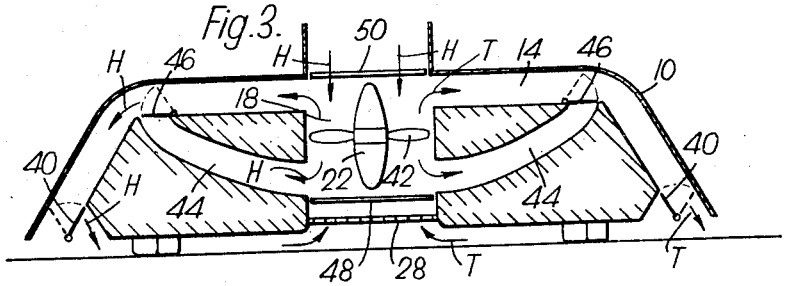
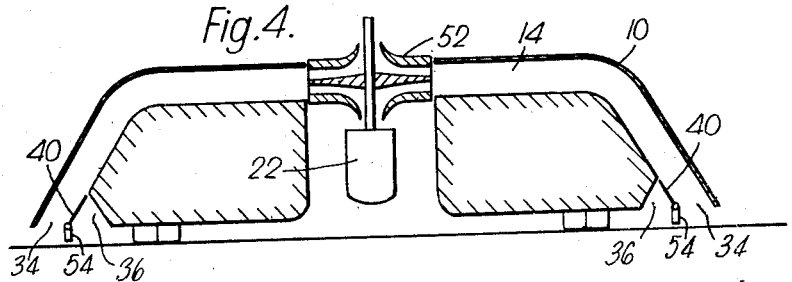
Inventor
ERIC HURST
By Darby & Darby
Attorneys

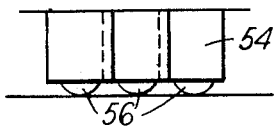
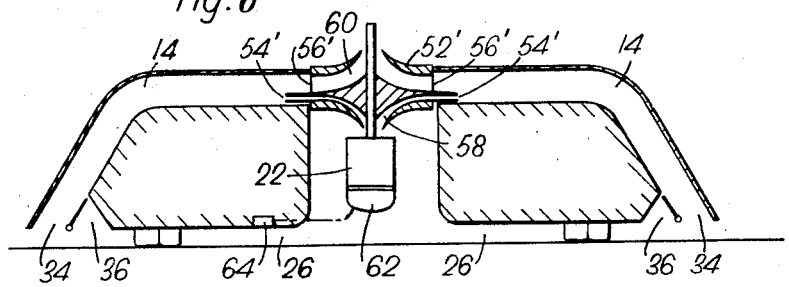
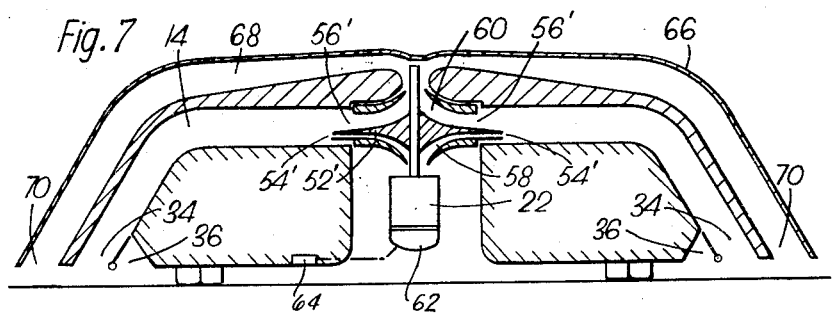

United States Patent Office 3,215,218
Patented Nov. 2, 1965

3,215,218
TRACTION INCREASING MEANS FOR VEHICLES
Eric Hurst, Flutters Hill, Longcross, near Chertsey, England
Filed Nov. 1, 1960, Ser. No. 66,490
Claims priority, application Great Britain, Nov. 11, 1959, 38,251/59
9 Claims. (Cl. 180—7)

This invention relates to land vehicles.

There are many occasions when it is essential or highly desirable that a land vehicle should have such traction that it remains stationary in a given position, or does not slip while moving, despite the application of strong forces which tend to move the vehicle out of that position or direction of movement. By way of example, one may cite the case of an earth-removing vehicle or a bulldozer on a building project, or a lorry which is required to climb steep and often slippery slopes in a quarry. Likewise, military vehicles including tanks and self-propelled guns must have traction which will enable them to move over irregular, slippery or hilly ground.

The aim of the present invention is to meet this requirement of certain land vehicles, and according to the invention the vehicle is provided with air-withdrawal means arranged to exhaust at least part of the air between the bottom of the vehicle and the surface on which it is supported so that the vehicle is forced towards that surface by atmospheric pressure. Thus, during operation of the air-withdrawal means, a partial vacuum is created beneath the vehicle with the result that the atmospheric pressure acting on the bottom of the vehicle becomes considerably smaller than the atmospheric pressure acting on the upper surfaces of the vehicle.

A major advantage of a vehicle in accordance with the invention is that its traction can be varied at will. When the vehicle is moving over land for which its normal traction is quite sufficient, the air-withdrawal or air-exhausting means mentioned above remain out of action. Directly, however, the vehicle encounters circumstances which demand increased traction, the air-exhausting means can be brought into operation.

In order that the invention may be thoroughly understood, a number of vehicles in accordance with it will now be described by way of example with reference to the accompanying drawing, in which:

FIGURES 1-4, 6 and 7 are vertical sections through seven different forms of vehicles; and FIGURE 5 is a side view of a detail.

The vehicle shown in FIGURE 1 comprises an outer shell 10 and an inner shell 12 which define an annular space 14 between them. The vehicle is supported on four or more double tired wheels 16 of which two are shown in end-view in the figure.

Located within the vehicle is a vertical cylindrical passage 18 in which there is arranged an impeller, rotor or propeller 20 driven by an internal combustion engine or other prime mover 22. This passage 18 leads into the annular space 14 which, in turn, leads outwards and downwards to an annular discharge opening 24 located a few inches above the ground around the peripheral portion of the lower surface of the vehicle body.

When it is desired to increase the traction of the vehicle, the engine 22 is started up with the result that the impeller or rotor 20 begins to exhaust some of the air from the space 26 lying between the bottom of the vehicle and the ground i.e. to cause increase of velocity and hence, according to Bernoulli's law, a decreased pressure beneath the vehicle. The air is drawn up through a sieve or other form of debris trap 28 and passes to the top of the passage 18 where it moves outwards through the annular space 14 to the annular discharge opening 24. The air discharged from the opening 24 forms an outwardly-inclined "curtain" which, because of its kinetic energy and its direction outwardly away from the space 26, provides a pressure to prevent air outside the curtain from entering the said space. If desired, the debris trap 28 can be arranged below the passage 18, provided always that it is capable of preventing earth and other material from damaging the impeller or rotor 20.

By controlling the speed of rotation or the pitch of the impeller or rotor 20, the velocity of the air flow in space 26 and hence the reduction in air pressure in the space 26 can be readily controlled. This means that the traction of the vehicle can be varied as desired.

FIGURES 2-4 show the application of the invention to an air-cushioned vehicle or "Hovercraft," that is to say, to a vehicle which can be supported on a cushion of air. The arrangement illustrated in FIGURE 2 is similar to that described in connection with FIGURE 1 except that two impellers or rotors 30 and 32 are provided instead of the single impeller 20, and the annular space 14 has two discharge openings 34 and 36 instead of only one. When the vehicle is operating as an air cushioned vehicle, the valve 38 is moved to its full-line position and the airflow follows the arrows H. When, however, the vehicle is resting on the ground and it is desired to increase its traction, the valve 38 is moved to its broken-line position and the air-flow follows the arrows T. The discharge openings 34 and 36 are controlled by valves 40 which are switched over whenever the valve 38 is moved.

FIGURE 3 is a modification of the vehicle shown in FIGURE 2. In this instance the two rotors 30 and 32 are replaced by a single variable and/or reversible pitch impeller or rotor 42, and extra passages 44 controlled by valves 46 are provided. As is obvious, if desired, the prime mover might be made reversible rather than utilizing a reversible pitch rotor. The air-flow when the vehicle is operating as an air cushioned vehicle is shown by the arrows H, while the arrows T show the air-flow when the vehicle is working with increased traction. Valves 48 and 50 control the flow of air into and through the passages 18 and 14 from above and below.

FIGURE 4 shows a further modification in which the two impellers or rotors 30 and 32 shown in FIGURE 2 are, in effect, merged into the single impeller of a centrifugal blower 52.

In order that the vehicle may function satisfactorily, a flexible curtain 54 can be provided near the discharge opening or openings of the annular space 14, for example, immediately below the pivotal mounting of the valves 40 shown in FIGURE 2 and between the discharge openings 34 and 36. This curtain can be of plastic material, or may comprise a number of overlapping metal plates (see FIGURE 5) having wheels 56, each plate being movable vertically. The advantage of providing such a curtain is that the length of the air curtain issuing from the annular discharge openings is maintained substantially constant.

FIGURE 6 shows a vehicle which is similar to that shown in FIGURE 4. The impeller 52' of blower 52 is vertically adjustable so that the cross-sectional area of the delivery ends 54' and 56' of the impeller passages 58 and 60 can be adjusted. In addition, the delivery end 54' of the passage 58 is so arranged relatively to the delivery end 56' of the passage 60 that the large volume of air delivered by the passage-end 56' entrains air from the passage 58. In other words, withdrawal of air from the space 26 beneath the vehicle is effected not only by the rotation of the impeller 52' but also by the ejector effect of the air passing through the passage 60. A further advantage of this arrangement is that the air-curtain which is produced at the delivery ends 34 and 36 of the annular space 14 is maintained primarily by air drawn from the atmosphere above the vehicle and not solely from the space 26.

Vertical adjustment of the impeller 52' of blower 52 can be carried out by power means 62 under manual or automatic control. Where automatic control is provided, the power means 62 can be under the control of a device 64 sensitive to the pressure of the air within the space 26.

The vehicle shown in FIGURE 7 is, in effect, a development of the vehicle shown in FIGURE 6. Thus, the construction shown in FIGURE 7 comprises a vehicle body 66 having a motor 22 which drives a vertically-adjustable impeller 52, the impeller being adjustable so as to vary the cross-sectional area of the delivery ends 54' and 56' of the impeller passages 58 and 60. As in FIGURE 6 the delivery end 54' of the passage 58 is so arranged relatively to the delivery end 56' of the passage 60 that the large volume of air delivered by the passage-end 56' entrains air from the passage 58. Also, vertical adjustment of the impeller 52 is effected automatically by power means 62 under the control of a device 64 which is sensitive to the pressure of the air within the space 26 beneath the vehicle.

The main difference between the vehicle shown in FIGURE 6 and that shown in FIGURE 7 is that, in the latter case, air is taken into the passage 60 from an outer annular passage 68 having an annular opening 70 adjacent the ground and near to the delivery openings 34 and 36 of the inner annular passage 14. The advantage of this arrangement is that the entry of air into the passage 68 through the opening 70 reduces the air pressure immediately outside the air curtain produced by the air issuing from the delivery opening 34. Thus, it becomes easier to maintain a partial vacuum within the space 26 beneath the vehicle.

In certain instances it may be advantageous for the flexible curtain 54 shown in FIGURE 5 to be so made that it leaves only a small "crack" between the vehicle and the surface on which it is supported, through which air can enter the partially-exhausted space 26 from the outside. This modification is applicable to all the vehicles described above.

As already indicated, the invention is applicable to many different kinds of vehicle, and besides the specific vehicles described or mentioned above the invention can be advantageously incorporated into transport vehicles and articulated vehicles.

I claim:

1. A land vehicle comprising a body, means located on said body so as to support the lower surface of said body clear of the surface on which said vehicle is located, air-withdrawal means carried by said body, an inlet to and an outlet from said air-withdrawal means, said inlet being connected by a passage to the space beneath said lower surface of said body, said air-withdrawal means being of a capacity to exhaust at least part of the air in the space between said lower surface of said body and said surface on which said vehicle is located whereby said vehicle is forced towards said last-mentioned supporting surface by atmospheric pressure, a passage connecting said outlet from said air-withdrawal means to an annular opening disposed around the peripheral portion of said lower surface of said body, said annular opening being outwardly-inclined in a direction away from said space beneath the lower surface of said body whereby air under pressure delivered from said annular opening moves away from said space beneath said lower surface of said body and opposes the entrance of outside air into said space.

2. A land vehicle as claimed in claim 1 wherein said air-withdrawal means comprise an impeller, said impeller being driven by a prime mover.

3. A land vehicle as claimed in claim 1 wherein said passage connecting said inlet of said air-withdrawal means to said space beneath said lower surface of said body contains a debris trap whereby to prevent foreign matter from entering said air-withdrawal means.

4. A land vehicle as claimed in claim 1 wherein a flexible, annular curtain depends from the peripheral portion of said lower surface of said body.

5. A land vehicle comprising a body, means located on said body so as to support the lower surface of said body clear of the surface on which said vehicle is located, air-withdrawal means carried by said body, an inlet to and an outlet from said air withdrawal means, said inlet being connected by a passage to the space beneath said lower surface of said body, said air-withdrawal means being of a capacity to exhaust at least part of the air in the space between said lower surface of said body and said surface on which said vehicle is located whereby said vehicle is forced towards said last-mentioned supporting surface by atmospheric pressure, a passage connecting said outlet from said air-withdrawal means to an annular opening disposed around the peripheral portion of said lower surface of said body, and valve means comprising a movable vane located at said annular opening whereby to deflect air under pressure delivered from said annular opening inwardly during one setting of said valve and outwardly away from said space beneath said body during a second setting of said valve.

6. A land vehicle as claimed in claim 5 wherein said air-withdrawal means comprise a reversible prime mover and wherein said valve means comprises additional vanes for directing air from above or beneath said vehicle into said annular opening.

7. A land vehicle as claimed in claim 5 wherein said air-withdrawal means comprise an impeller having two inlets whereby to suck in air from two different directions.

8. A land vehicle as claimed in claim 5 wherein said air-withdrawal means comprise two inlets, one of said inlets being connected by an annular passage to an annular opening disposed around the peripheral portion of said lower surface of said body.

9. A land vehicle as claimed in claim 5 wherein pressure-sensitive means are arranged at said lower surface of said body whereby to detect variations in the pressure of the air in said space beneath said lower surface of said body, control means for said air withdrawal means, said control means being operated by said pressure sensitive means.

References Cited by the Examiner

UNITED STATES PATENTS

| 1,698,482 | 1/29 | Nicin | 180—7 |
| 2,730,065 | 1/56 | Piper | 115—14 |
| 2,807,428 | 9/57 | Wibault. | |
| 2,838,257 | 6/58 | Wibault. | |

OTHER REFERENCES

Publication: "Popular Science," July 1959, pages 51 through 55 and 194.

Publication: "Design News," May 23, 1960, pages 6 and 7.

A. HARRY LEVY, *Primary Examiner.*

PHILIP ARNOLD, *Examiner.*